United States Patent
Srinivasan et al.

(10) Patent No.: US 10,001,046 B2
(45) Date of Patent: Jun. 19, 2018

(54) METHODS TO ADAPT REDUCTANT INJECTION CONTROLS FOR CATALYST AGING

(71) Applicant: General Electric Company, Schenectady, NY (US)

(72) Inventors: Prashant Srinivasan, Bangalore (IN); William Collins Vining, Niskayuna, NY (US); Maruthi Narasinga Rao Devarakonda, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 185 days.

(21) Appl. No.: 14/942,644

(22) Filed: Nov. 16, 2015

(65) Prior Publication Data

US 2017/0138244 A1     May 18, 2017

(51) Int. Cl.
*F01N 3/00* (2006.01)
*F01N 3/02* (2006.01)
(Continued)

(52) U.S. Cl.
CPC ............ *F01N 11/00* (2013.01); *F01N 3/0835* (2013.01); *F01N 3/0842* (2013.01);
(Continued)

(58) Field of Classification Search
CPC ...... F01N 11/00; F01N 3/0835; F01N 3/0842; F01N 3/0857; F01N 3/101; F01N 3/206; F01N 3/208; F01N 3/2066; F01N 9/00; F01N 2430/06; F01N 2550/02; F01N 2550/03; F01N 2560/021; F01N 2560/026;
(Continued)

(56) References Cited

U.S. PATENT DOCUMENTS 6,085,518 A    7/2000   Yamashita et al.
6,263,667 B1   7/2001   Sawada et al.
(Continued)

FOREIGN PATENT DOCUMENTS

DE         19839791 A1    3/1999
DE   102010005428 A1    7/2011
(Continued)

OTHER PUBLICATIONS

Machine Translation DE 10 2010 005428 Done Jun. 26, 2017.*
(Continued)

*Primary Examiner* — Patrick Maines
*Assistant Examiner* — Dapinder Singh
(74) *Attorney, Agent, or Firm* — Fletcher Yoder, P.C.

(57) ABSTRACT

A system includes an exhaust treatment system configured to treat emissions from a combustion engine via a catalyst. The system includes a controller configured to obtain an operating parameter indicating catalyst performance. The controller is configured to determine a deterioration factor indicating deterioration of the catalyst based at least in part on the operating parameter. The controller is configured to determine an adaptation term configured to modify a reductant injection command for the combustion engine to account for the deterioration factor of the catalyst. The controller is configured to generate a signal indicating the adaptation term.

19 Claims, 6 Drawing Sheets

(51) Int. Cl.
*F01N 3/10* (2006.01)
*F01N 3/20* (2006.01)
*F01N 11/00* (2006.01)
*F01N 3/08* (2006.01)
*F01N 9/00* (2006.01)

(52) U.S. Cl.
CPC ........... *F01N 3/0857* (2013.01); *F01N 3/101* (2013.01); *F01N 3/206* (2013.01); *F01N 3/208* (2013.01); *F01N 9/00* (2013.01); F01N 3/2066 (2013.01); F01N 2430/06 (2013.01); F01N 2550/02 (2013.01); F01N 2550/03 (2013.01); F01N 2560/021 (2013.01); F01N 2560/026 (2013.01); F01N 2560/06 (2013.01); F01N 2560/07 (2013.01); F01N 2570/14 (2013.01); F01N 2610/02 (2013.01); F01N 2610/146 (2013.01); F01N 2900/0412 (2013.01); F01N 2900/08 (2013.01); F01N 2900/1621 (2013.01); F01N 2900/1622 (2013.01); F01N 2900/1624 (2013.01); F01N 2900/1812 (2013.01); Y02T 10/22 (2013.01); Y02T 10/24 (2013.01); Y02T 10/47 (2013.01)

(58) Field of Classification Search
CPC ............ F01N 2560/06; F01N 2560/07; F01N 2570/14; F01N 2610/146; F01N 2900/0412; F01N 2900/08; F01N 2900/1621; F01N 2900/1622; F01N 2900/1624; F01N 2900/1812
USPC .................. 60/274, 277, 285, 286, 295, 301
See application file for complete search history.

(56) References Cited

U.S. PATENT DOCUMENTS

| | | | |
|---|---|---|---|
| 6,338,243 | B1 | 1/2002 | Takaoka et al. |
| 6,629,409 | B2 | 10/2003 | Lewis et al. |
| 6,904,751 | B2 | 6/2005 | Makki et al. |
| 8,621,854 | B2 * | 1/2014 | Mullins .................. F01N 3/023 60/277 |
| 9,114,363 | B2 | 8/2015 | Davarakonda |
| 2003/0000205 | A1 | 1/2003 | Lewis et al. |
| 2004/0244364 | A1 | 12/2004 | Makki et al. |
| 2011/0153260 | A1 | 6/2011 | Sacco et al. |
| 2015/0047319 | A1 | 2/2015 | Larose et al. |

FOREIGN PATENT DOCUMENTS

| | | |
|---|---|---|
| DE | 102012202671 A1 | 8/2013 |
| EP | 1106800 A1 | 6/2001 |
| GB | 2475318 A | 5/2011 |
| JP | 0915765 A | 6/1997 |

OTHER PUBLICATIONS

U.S. Appl. No. 14/569,225, filed Dec. 12, 2014, Maruthi Narasinga Rao Devarakonda.
U.S. Appl. No. 14/568,580, filed Dec. 12, 2014, James Kristopher von der Ehe.
U.S. Appl. No. 14/644,399, filed Mar. 11, 2015, Maruthi Narasinga Rao Devarakonda.
U.S. Appl. No. 14/660,135, filed Mar. 17, 2015, Maruthi Narasinga Rao Devarakonda.
U.S. Appl. No. 14/669,934, filed Mar. 26, 2015, Maruthi Narasinga Rao Devarakonda.
U.S. Appl. No. 14/680,934, filed Apr. 7, 2015, Pin Zeng.
U.S. Appl. No. 14/686,350, filed Apr. 14, 2015, Maruthi Narasinga Rao Devarakonda.
International Search Report and Written Opinion issued in connection with corresponding Application No. PCT/US2016/052199 dated Nov. 24, 2016.
International Search Report and Written Opinion issued in connection with corresponding Application No. PCT/US2016/052202 dated Nov. 28, 2016.

* cited by examiner

METHODS TO ADAPT REDUCTANT INJECTION CONTROLS FOR CATALYST AGING

BACKGROUND

The subject matter disclosed herein relates to an exhaust treatment system for an internal combustion engine and, more specifically, to adapting controls based on catalyst performance.

Engines (e.g., internal combustion engines such as reciprocating engines or gas turbines) combust a mixture of fuel and air to generate combustion gases that apply a driving force to a component of the engine (e.g., to move a piston or drive a turbine). Subsequently, the combustion gases exit the engine as an exhaust, which may be subject to exhaust treatment systems that include one or more catalytic converters (e.g., three-way catalyst (TWC) assembly, selective catalytic reduction (SCR) assembly) to reduce the emissions of nitrogen oxides ($NO_x$), hydrocarbons (HC), carbon monoxide (CO), and other emissions. However, the effectiveness of the catalysts at reducing emissions may decrease over time, resulting in the engine falling out of emissions compliance.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes an exhaust treatment system configured to treat emissions from a combustion engine via a catalyst, and a controller configured to obtain an operating parameter indicating catalyst performance, determine a deterioration factor indicating deterioration of the catalyst based at least in part on the operating parameter, determine an adaptation term configured to modify a reductant injection command for the combustion engine to account for the deterioration factor of the catalyst, and generate a signal indicating the adaptation term.

In a second embodiment, an electronic control unit includes a processor operatively coupled to a memory, wherein the processor is programmed to execute instructions on the memory to obtain an operating parameter that indicates how well a catalyst is performing in treating emissions from a combustion engine, determine a deterioration factor that indicates how much the catalyst has deteriorated based at least in part on the operating parameter, determine an adaptation term configured to modify a reductant injection command for the combustion engine to account for the deterioration factor of the catalyst, and generate a signal indicating the adaptation term.

A third embodiment includes one or more non-transitory computer-readable media encoding one or more processor-executable routines wherein the one or more routines, when executed by a processor of a controller, cause acts to be performed including obtaining an operating parameter that indicates a conversion performance of a catalyst utilized to treat emissions from a combustion engine, determining a deterioration factor that indicates how much the catalyst has deteriorated based at least in part on the operating parameter, determining an adaptation term configured to modify a reductant injection command for the combustion engine to account for deterioration factors of the catalyst, and generating a signal indicating the adaptation term.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for monitoring or estimating the deterioration of catalysts in catalytic converters and adjusting controls in response to the detected or estimated deterioration (e.g., deactivation of catalysts). The system and method discussed herein may be performed in three-way catalyst (TWC) and/or selective catalytic reduction (SCR) exhaust treatment systems. Exhaust treatment (e.g., aftertreatment) systems are configured to couple to combustion engines to treat emissions (e.g., in the engine exhaust) from the combustion engine. The exhaust treatment system may include a catalyst based system, such as a TWC system that utilizes a catalyst to convert harmful pollutants, such as $NO_x$, HC, CO, to less toxic emissions. Unfortunately, subjecting the TWC to certain operating conditions over time often causes changes in the number and type of active sites reactions take place on. The loss of active sites on the surface of the catalysts can result in a loss of conversion performance (i.e., how well the catalyst is operating). As catalyst conversion performance decreases, the emissions of pollutants (e.g., $NO_X$, HC, CO, etc.) from the engine can exceed emission compliance values (e.g., thresholds or requirements). By adapting the air-fuel ratio controls of the engine based on the catalyst performance, the engine can remain in emissions compliance for a longer duration of time than if the air-fuel ratio controls were not adapted based on catalyst performance.

The disclosed embodiments include measuring or obtaining one or more operating parameters of a combustion engine that indicate the conversion performance of the catalysts. The operating parameters may include any actual or estimated aspects of the system performance suitable for indicating the conversion performance of the catalysts, such as time (e.g., engine run time, catalyst aging time, times at different engine temperatures, etc.), temperatures, flow rates, and/or emission measurements. The conversion performance may describe how well the catalyst is performing at converting pollutants to less harmful emissions. A control system may determine a deterioration factor that indicates how much the catalyst has deteriorated (e.g., over a period of time) based on the operating parameter. The control system may then adapt air-fuel controls of the combustion engine based on the conversion performance to account for deterioration of the catalyst, such as the loss of active sites on the catalyst due to aging, temperature, flow rate, and/or species inputs.

Figure 1:
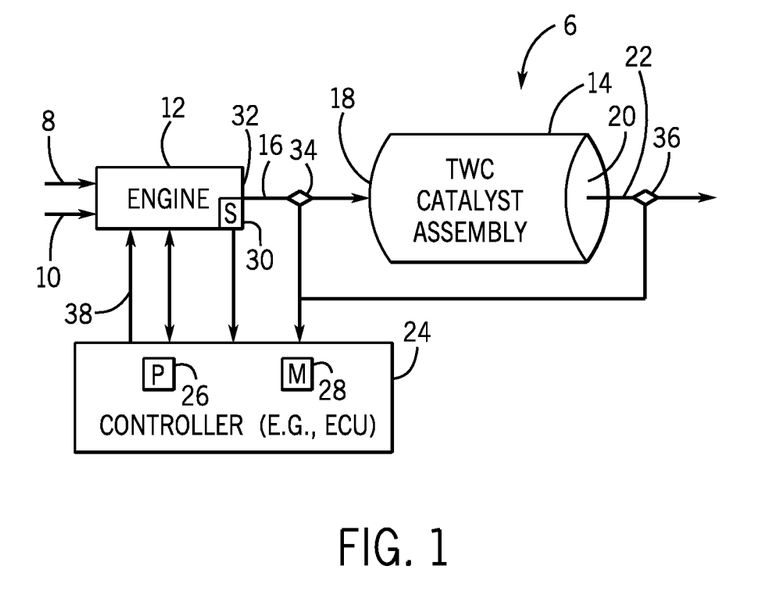
FIG. 1 is a schematic diagram of an embodiment of a three-way catalyst (TWC) exhaust treatment (e.g., aftertreatment) system coupled to an engine.

Turning now to the drawings and referring to FIG. 1, a schematic diagram of a TWC exhaust treatment (e.g., aftertreatment) system 6 coupled to an engine 12 is illustrated. As described in detail below, the disclosed exhaust treatment system 6 monitors operating parameters (e.g., oxidation state) of a catalyst assembly 14 of the exhaust treatment system 6. The engine 12 may include an internal combustion engine such as a reciprocating engine (e.g., multi-stroke engine such as two-stroke engine, four-stroke engine, six-stroke engine, etc.) or a gas turbine engine. The engine 12 may operate on a variety fuels (e.g., natural gas, diesel, syngas, gasoline, blends of fuel (e.g., methane, propane, ethane, etc.), etc.). The engine 12 may be part of a power generation system that generates power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, or 900 RPM. In some embodiments, the engine 12 may operate between approximately 800-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

During operation, the engine 12 receives air 8 (e.g., an oxidant) and fuel 10 that are used in a combustion process to apply a driving force to a component of the engine 12 (e.g., one or more pistons reciprocating in cylinders or one more turbines). The combustion gases 16 subsequently exit the engine 12 as an exhaust 16, which includes a variety of emissions (e.g., $NO_X$, HC, CO, or other pollutants). The exhaust treatment system 6 treats these emissions to generate milder emissions (carbon dioxide ($CO_2$), water, etc). As depicted, the exhaust treatment system 6 includes the catalytic converter or catalyst assembly 14. The catalyst assembly 14 (e.g., TWC assembly) includes an inlet 18 to receive the exhaust 16 (e.g., fluid) from the engine 12 and an outlet 20 to discharge treated engine exhaust 22. As shown in FIG. 1, the catalyst assembly 14 includes a TWC assembly. The TWC assembly, via its catalytic activity, reduces $NO_X$ via multiple reactions. For example, $NO_X$ may be reduced via CO to generate $N_2$ and $CO_2$, $NO_X$ may be reduced via $H_2$ to generate $NH_3$, $N_2$, and water, and $NO_X$ may be reduced via a hydrocarbon (e.g., $C_3H_6$) to generate $N_2$, $CO_2$, and water. The TWC assembly also oxidizes CO to $CO_2$, and oxidizes unburnt HC to $CO_2$ and water.

The engine 12 may operate as a rich-burn engine or a lean-burn engine depending on the mass ratio of air 8 to fuel 10 (AFR). In embodiments that include the TWC assembly, the engine 12 may be operated as a rich-burn engine (e.g., equivalence ratio (i.e., ratio of actual AFR to stoichiometric AFR), or lambda ($\lambda$) value oscillating around 1 (e.g., stoichiometric engine)) to maximize the catalytic activity in the TWC assembly. In other embodiments, the catalyst assembly 14 may include any other type of oxidation catalyst (e.g., two-way catalyst, hydrocarbon oxidation catalyst, diesel oxidation catalyst, etc.). In certain embodiments, the exhaust treatment system 6 may include one or more additional catalyst assemblies disposed upstream and/or downstream of the catalyst assembly 14 (e.g., an ASC assembly disposed between the engine 12 and the catalyst assembly). In certain embodiments, the exhaust treatment system 6 may include other components (e.g., an oxidant injection system that injects air 8 (e.g., an oxidant, $O_2$, $O_2$-enriched air, or $O_2$-reduced air) into the exhaust 16).

The engine 12 and the exhaust treatment system 6 are coupled (e.g., communicatively) to a controller 24 (e.g., an engine control unit (ECU)) that controls and monitors the various operations of the engine 12. The controller 24 may include multiple controllers in communication with each other (e.g., a respective controller for the engine 12 and the exhaust treatment system 6). The controller 24 includes processing circuitry (e.g., processor 26) and memory circuitry (e.g., memory 28). The processor 26 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 26 may include one or more reduced instruction set (RISC) processors or complex instruction set (CISC) processors. The processor 26 may execute instructions to carry out the operation of the engine 12 and/or exhaust treatment system 6. These instructions may be encoded in programs or code stored in a tangible non-transitory computer-readable medium (e.g., an optical disc, solid state device, chip, firmware, etc.) such as the memory 28. In certain embodiments, the memory 28 may be wholly or partially removable from the controller 24.

The memory 28 may store various tables (e.g., look-up tables (LUT)). The memory 28 may also store models (e.g., software models representing and/or simulating various aspects of the engine 12, the exhaust treatment system 6, and/or each of their components). For example, the memory 28 may store models used to estimate how flow rate, temperature, oxygen, or emissions correspond to catalyst performance. The models may be used to compare estimated values to measured values indicating the conversion performance of the catalyst.

The processor 26 of the controller 24 may be configured to execute instructions to control various aspects of the engine, such as the air-fuel ratio (AFR). That is, the processor 26 may be configured to control air 8 and fuel 10 quantities that enter the engine 12 during the combustion process to optimize the performance of the engine 12 (e.g., based on throttle, output, RPM, or any number of factors). Further, the controller 24 also controls and/or monitors the operations of the exhaust treatment system 6, such as the AFR. In an embodiment, the processor 26 may control the air 8 and fuel 10 quantities based at least in part on an adaptation term (e.g., part, aspect, etc.) that accounts for changes (e.g., deterioration) in the conversion performance of the catalyst.

Figure 2:
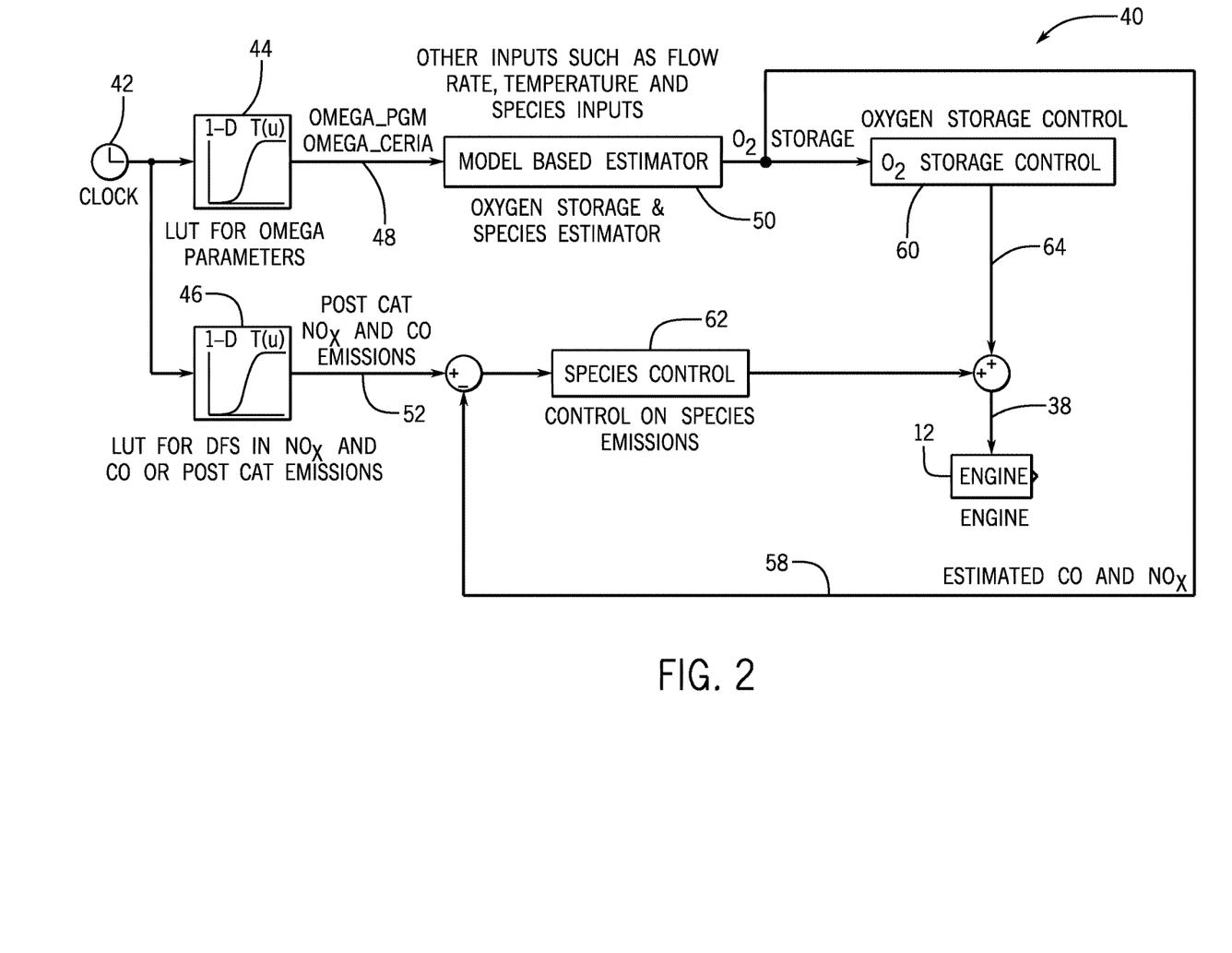
FIG. 2 is a schematic diagram of an embodiment of the functional operation of a controller (e.g., an electronic control unit (ECU)) that controls the air-fuel command of the engine of FIG. 1.

FIG. 2 is a schematic diagram of functional operations 40 for the controller 24 to control the AFR of the engine 12 of FIG. 1. All or some of the steps of the functional operations 40 described in FIG. 2 may be executed by the controller 24 (e.g., utilizing the processor 26 to execute programs and access data stored on the memory 28). In addition, one or more of these steps may be performed simultaneously with other steps.

The operations 40 of FIG. 2 may be performed to adapt an AFR command 38 to account for decreasing conversion performance of the catalyst. The conversion performance may deteriorate as the number of active sites that reactions take place on decrease. The loss of active sites (i.e., the loss of conversion performance) may occur due to aging, flow rate, temperature, and/or species inputs. The processor 26 may determine an adaptation term to account for the deterioration of the catalyst. The adaptation term is configured to modify the air-fuel ratio command 38 of the combustion engine 12 based at least in part on the conversion performance.

To account for aging of the catalyst, a clock 42 may be utilized to provide an amount of time 42 (e.g., how long the catalyst has been operating) based on clock cycles for the processor 26 to access. The processor 26 may utilize one or more look up tables (LUT) stored the in memory 28, such as an omega parameter LUT 44 and/or a $NO_X$, CO, or post catalyst emission LUT 46. The omega parameter LUT 44 may include one or more catalysts, such as a platinum group metal (PGM), ceria, or any other suitable catalyst and an omega parameter that indicates how the catalyst ages over time. As such, the omega parameter LUT 44 may provide a deterioration factor 48 (e.g., Omega_PGM, Omega_Ceria, etc.) that indicates how much the catalyst has deteriorated (e.g., due to aging) based at least in part on one or more operating parameters, such as the time (e.g., from clock 42) and/or a type of the catalyst (e.g., PGM, Ceria, etc.), as different catalysts may age at different rates. The processor 26 may adjust the deterioration factor 48 linearly and/or exponentially, as the deterioration of some types of catalysts may vary linearly and/or exponentially based on time. The deterioration factor 48 may also be based on precious metal loading of the catalyst.

The deterioration factor 48 may further account for other causes of losses in conversion performance in the catalyst, such as flow rate, temperature, and species inputs. The various sensors 34 coupled to the system 6 may detect operating parameters that may be suitable for establishing deterioration factors. For example, temperature may be detected via the sensors 34. As high temperatures may cause a decrease in conversion performance, the processor 26 may utilize the model based estimator 50 to determine a deterioration factor 48 that accounts for temperature. For example, the model may have temperatures that correspond to different rates of aging of the catalyst. As a further example, the model based estimator 50 may use a measured oxygen value (e.g., how much oxygen is missing from the expected amounts of $O_2$ storage 60) when determining deterioration factors. The model may be general to any type of catalyst or specific to certain catalysts. As mentioned above, the processor 26 may account for changes in catalyst conversion performance by varying the deterioration factor 48 linearly and/or exponentially proportional to precious metal loading.

The controller 24 may use a model stored in the memory to estimate the emissions of certain species (e.g., $NO_X$ and $NH_3$). The processor 26 may utilize a $NO_X$, CO, or post catalyst emission LUT 46 to determine the deterioration factors 52 based at least in part on pre or post catalyst emission values. That is, based on the amounts of various emissions, the processor 26 may determine a deterioration factor 52 for how well the catalyst is performing. The deterioration factor 52 based on emissions may then be compared to the $O_2$ storage data. In the embodiment shown in FIG. 2, the species control 58 can modify the $O_2$ storage set-point given the oxygen storage control 60. Alternatively and/or additionally, the $O_2$ storage control 60 set-point may be used to modify the species control 62.

The processor 26 may determine the adaptation term 64 to modify the air-fuel ratio command 38 provided to the combustion engine to account for the one or more deterioration factors 48, 52 of the catalyst. The controller 24 may then regulate or adjust the air-fuel ratio of the engine 12 based on the air-fuel ratio command 38. Additionally and/or alternatively, the controller 24 may control one or more other engine operating parameters, such as spark timing. By modifying the air-fuel ratio command 38, the controller 24 can allow the engine 12 to remain in emissions compliance for an extended duration of time longer as the catalyst ages, where the extended duration of time is longer than a duration of time had the air-fuel ratio not been modified. By extending the duration of remaining in compliance, the controller 24 reduces maintenance and further improving operation of the engine. The adaptation term 64 may include a linear or weighted combination of oxygen storage control 60 estimates and/or species concentration estimates. As explained above, the oxygen storage estimates and/or species concentration estimates utilize maps (e.g., LUT 44, 46) of deterioration factors to analyze the operating parameters.

Figure 3:
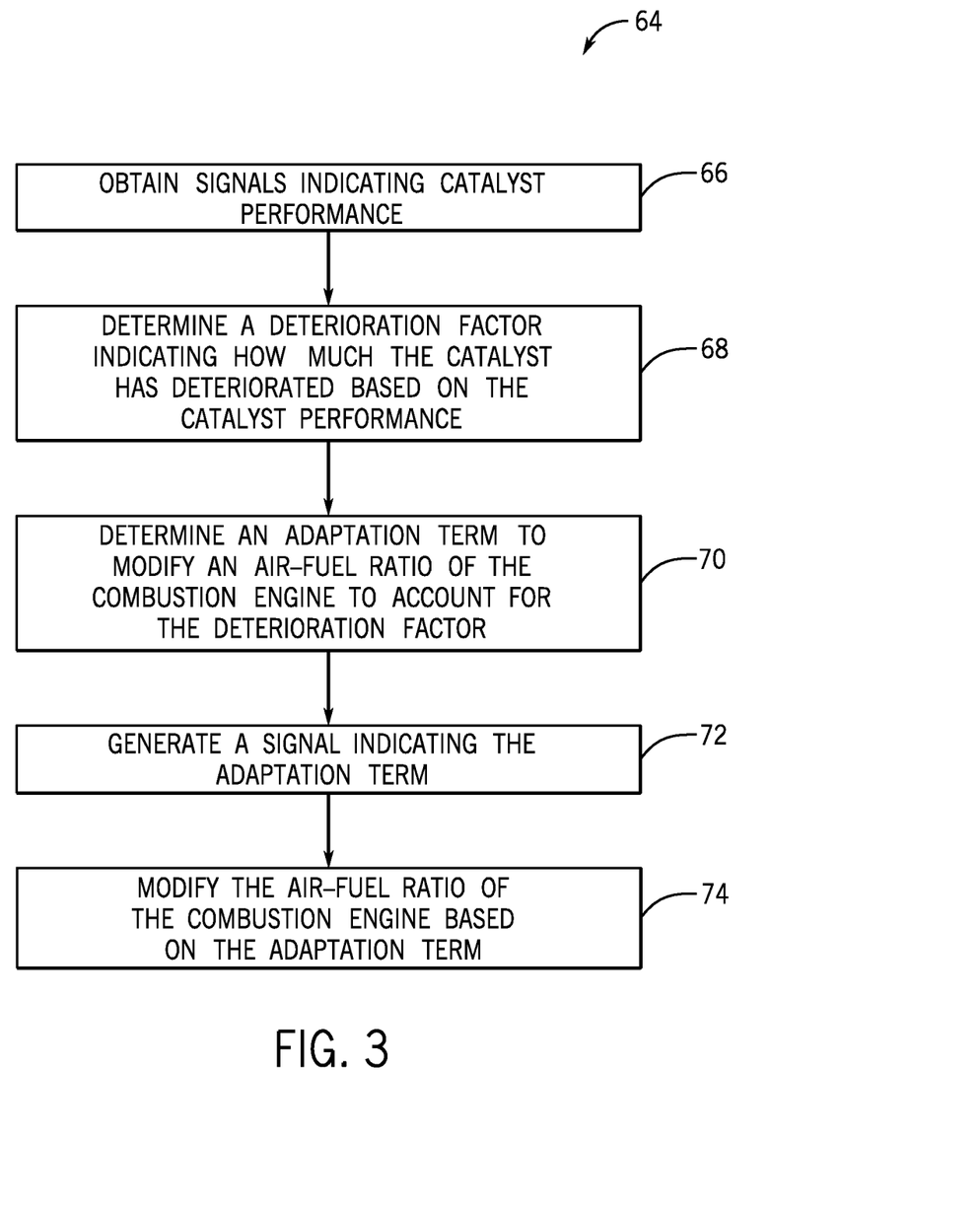
FIG. 3 is a flow diagram of an embodiment of a process performed by a processor of the controller of FIG. 1.

The processor 26 may execute instructions (e.g., code) stored on the memory 28 to carry out the operation of the engine 12 and/or exhaust treatment system 6 in accordance with the processes described herein. FIG. 3 is a flow diagram of an embodiment of a process 64 performed by one or more of the processors 26 of the controller 24. This process 64 may be applied to TWC catalyst systems. The process 64 may begin by obtaining signals indicating catalyst performance (block 66). Catalyst performance indications may be obtained via the sensors 34, 36 and/or the clock 42. The process 64 may then continue by determining (block 68) a deterioration factor indicating how much the catalyst has deteriorated based on the catalyst performance Next, one or more of the processors 26 may determine an adaptation term to modify the air-fuel ratio of the engine to account for the deterioration factor (block 70). Then, the processor 26 may generate a signal that is based on the adaptation term that modifies the air-fuel ratio. For example, the processor 26 may generate a signal indicating the adaptation term (block 72). The processor 26 may then modify the air-fuel ratio of the combustion engine based on the adaptation term (block 74). By modifying the air-fuel ratio command or the oxidant injection based on an adaptation term that accounts for aging of a catalyst, the controller can enable the combustion engine to remain in emissions compliance for an extended duration of time as the catalyst ages.

Figure 4:
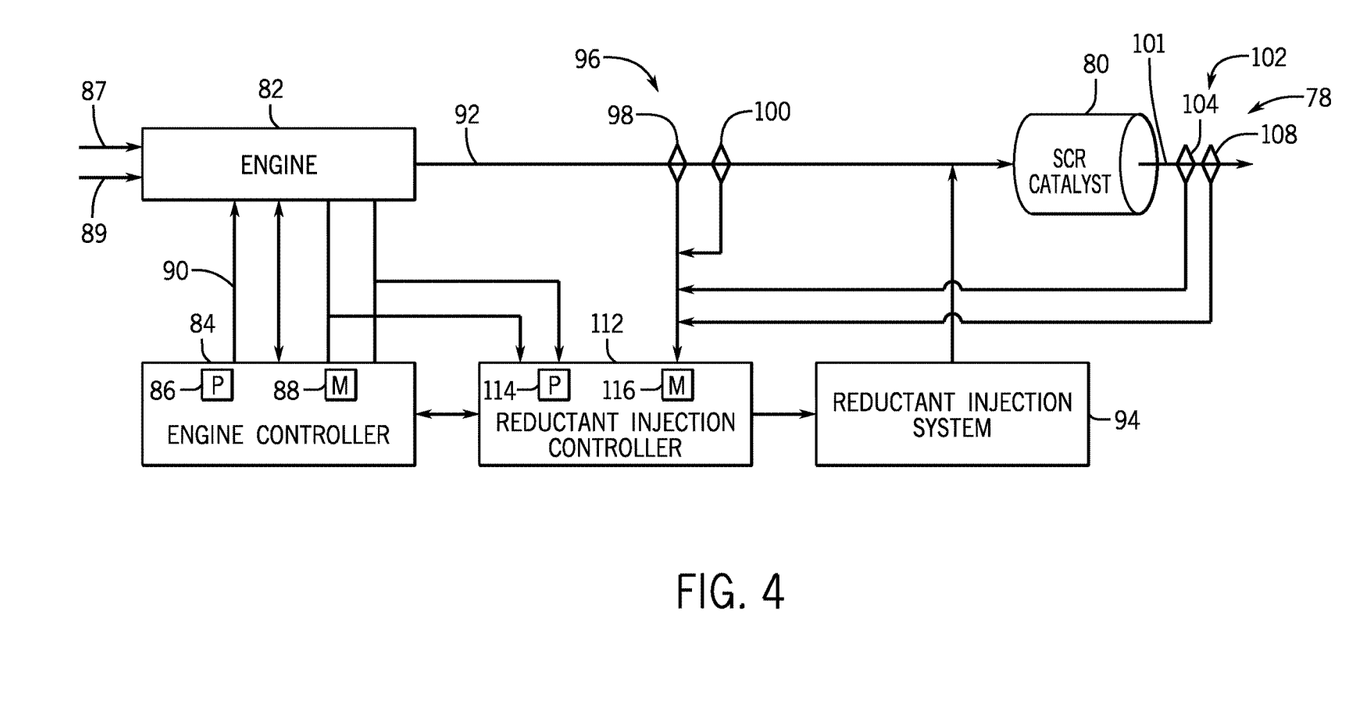
FIG. 4 is a schematic diagram of an embodiment of a selective catalytic reduction (SCR) exhaust treatment system for a lean burn engine.

The systems and methods may be applied to selective catalytic reduction (SCR) exhaust treatment systems for lean-burn engine exhaust treatment controls. FIG. 4 is schematic diagram of an embodiment of an SCR exhaust treatment system 78 that uses an SCR catalyst assembly 80 for a lean-burn engine 82. Similar to the TWC system described with respect to FIG. 1, the lean-burn engine 82 is coupled to a controller (e.g., engine control unit) 84 that controls and monitors the operations of the engine 82. The engine controller 84 includes processing circuitry (e.g., processor 86) and memory circuitry (e.g., memory 88). The processor 86 may execute instructions (e.g., stored in the memory 88) to carry out the operation of the engine 82. The processor 86 of the controller 84 may operate similar to the controller 24 and may be configured to generate one or more commands to control the engine 82, such as a reductant injection (e.g., anhydrous ammonia, aqueous ammonia, or urea) command 90 that controls the reductant that injected the engine 82.

The SCR exhaust treatment system 78 may convert pollutants, such as $NO_X$ emissions, from the exhaust 92 of the engine 82. Further, the SCR exhaust treatment system 78 may include a reductant injection system 94 that injects a reductant, such as $NH_3$ or urea, into the exhaust 92 and received by the SCR catalyst assembly 80. The lean-burn engine 82 may generate exhaust 92 having $NO_X$ or other undesirable pollutants which are output at various temperatures and flow rates. Sensors 96 are coupled to or downstream of the engine 82 and are configured to measure the temperature and flow rates of the various exhaust 92 parameters. For example, the sensors 96 may include one or more pre-SCR ammonia ($NH_3$) sensors 98 and/or one or more pre-SCR nitrogen oxides ($NO_X$) sensors 100 configured to measure the concentrations of the reductant and/or the pollutants, respectively, in the exhaust 92. Further, one or more post-SCR $NH_3$ sensors 102 and/or $NO_X$ sensors 106 may be disposed downstream of the catalyst assembly to measure a concentration or an amount of pollutants and/or reductants in the treated engine exhaust 101. Even further, one or more RF probes or sensors 108 may be disposed within or coupled to the catalyst assembly 80 to measure reductant storage of the catalyst assembly 80. In certain embodiments, the $NH_3$ storage measurement from the RF probes 108 may take the form of a voltage reading. In certain embodiments, the voltage reading may be converted to an $NH_3$ storage value, $\theta$ (e.g., utilizing a LUT).

Signals from the sensors 96, 102, 108 may be used by a reduction injection controller 112. The reduction injection controller 112 may include a processor 114 and/or a memory 116. The processor 114 and the memory 116 may be used to execute instructions related to controlling the reductant injected into the exhaust 92. Additionally, signals may be sent to the engine controller 84 for the engine controller 84 to control operating parameters of the engine based on reductant measurements.

Figure 5:
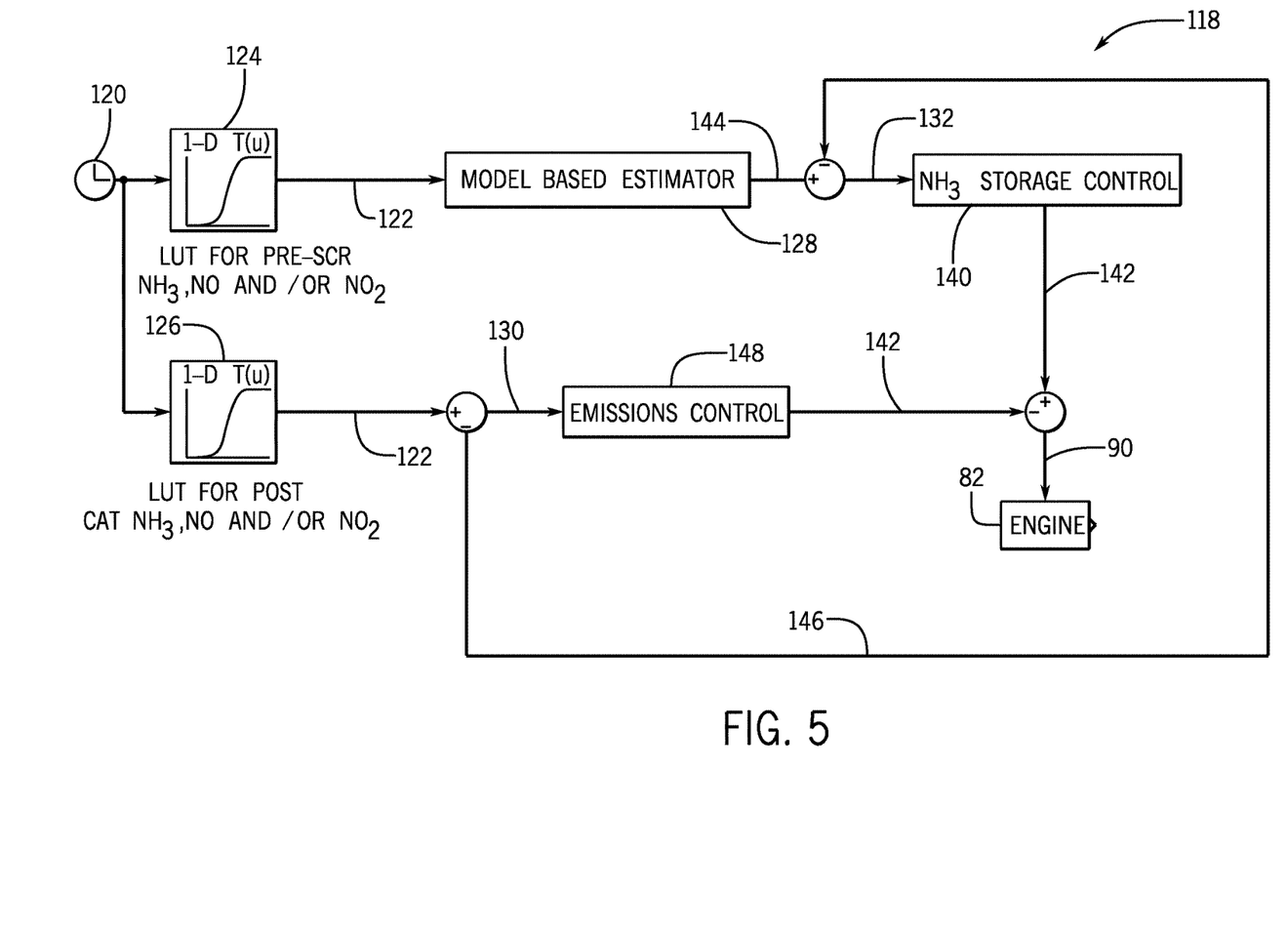
FIG. 5 is a schematic diagram of an embodiment of a function operation of a controller (e.g., an electronic control unit (ECU)) that controls the air-fuel command of the lean burn engine of FIG. 4.

The controllers 84 and/or 112 may modify the reductant injection based on catalytic performance to allow the lean-burn engine 82 to remain in compliance for an extended period of time. That is, the controllers 84 and/or 112 enable the engine to be in emissions compliance for a period of time longer than if the controllers 84 and/or 112 did not modify the reductant injection based on the catalytic performance. FIG. 5 is a schematic diagram of function operations for the controllers 84 and/or 112 to adapt the reductant injection to the exhaust of the engine 82 based on the catalytic performance. All or some of the steps of the functional operations 118 described in FIG. 5 may be executed by the controllers 84 and/or 112 (e.g., utilizing the processor 86 to execute programs and access data stored on the memory 28). In addition, one or more of these steps may be performed simultaneously with other steps.

Similar to the TWC system described above, these instructions may be encoded in programs or code stored in a tangible non-transitory computer-readable medium (e.g., an optical disc, solid state device, chip, firmware, etc.) such as the memory 88. In certain embodiments, the memory 88 may be wholly or partially removable from the controller 24. The memory 88 may store various tables (e.g., look-up tables (LUT)). The memory 88 may also store models (e.g., software models representing and/or simulating various aspects of the engine 82, the exhaust treatment system 78, and/or each of their components). For example, the memory 88 may store models used to estimate how flow rate, temperature, ammonia, or emissions correspond to catalyst performance. The models may be used to compare estimated values to measured values indicating the conversion performance of the catalyst.

As catalysts deteriorate over time, the catalysts in the SCR catalyst assembly 80 may not convert the pollutants as efficiently and/or reduce pollutants enough for the engine 82 to stay in compliance and/or to minimize maintenance. That is, the conversion performance may deteriorate as the number of active sites that reactions take place on decrease. The loss of active sites (i.e., the loss of conversion performance) may occur due to aging, flow rate, temperature, and/or species inputs.

The controllers 84 and/or 112 may utilize one or more engine operating parameters (e.g. actual operating parameters measured by the sensors 96, 102, 108 and/or estimated operating parameters), such as the measured $NH_3$ and/or $NO_X$ concentrations (e.g., received from the $NH_3$ sensors 98, 104 and/or the $NO_X$ sensors 100, 106) upstream and downstream of the catalyst assembly 80.

The controllers 84 and/or 112 may utilize the signals from the sensors 96, 102, 108 to determine a deterioration factor 122 indicating the deterioration (e.g., due to aging) of the catalyst based on one or more operating parameters of catalytic performance, such as a type of catalyst, as different catalysts may age at different rates. Alternatively and/or additionally, the processors 86 and/or 114 may receive signals from a clock 120 that can be used to estimate the deterioration of the catalyst. For example, the processors 86 and/or 114 may utilize one or more LUTs 124, 126 with times from the clock 120 (e.g., based on clock cycles of the processor 86) associated with aging of the catalyst to determine the deterioration factor 122. As time measured by the clock 120 progresses, the LUT may provide increasing deterioration of the catalyst. The processors 86 and/or 114 may adjust the deterioration factor 122 linearly and/or exponentially, as the deterioration of some types of catalysts may vary linearly and/or exponentially based on time.

The deterioration factor 122 may further account for other causes of losses in conversion performance in the catalyst and be used by a model based estimator 128 to determine an $NH_3$ storage control estimation signal 132. The controller 84 may input the operating parameters and/or the deterioration factor 122 into the model based estimator 128 (e.g., software-based model) to generate an estimate of the $NH_3$ storage control 140 state of the catalyst assembly 80 and/or estimates of emissions controls 148 for emissions (e.g., $NO_X$) exiting the catalyst assembly 80. For example, the measured $NH_3$ concentration upstream and downstream of the catalyst assembly 80 may be utilized in the model to generate the estimated $NH_3$ storage control 140 of the catalyst assembly 80 and/or the estimated $NH_3$ emissions exiting the catalyst assembly 80. In other embodiments, the measured $NO_X$ concentration upstream and downstream of the catalyst assembly 80 may be utilized in the model to generate the estimated emissions control for the catalyst assembly 80. The controller 84 may compare an estimated $NH_3$ storage to a measured $NH_3$ storage (e.g., based on feedback from the RF probes 108) for the catalyst assembly 80. For example, the model based estimator 128 may determine an estimation signal 132 that accounts for aging of the catalyst (e.g., via the deterioration factor 122 from the LUT 124 and/or the LUT 126), temperature, flow rate, and/or species inputs. As explained above with respect to the TWC catalyst assembly, the model 128 may have temperatures that correspond to different rates of aging of the catalyst.

To account for aging of the catalyst, the clock 120 may be utilized to provide an amount of time (e.g., how long the catalyst has been operating) based on clock cycles for the processor 86 and/or 114 to access. The processor 86 and/or 114 may utilize the LUT 124 and/or the LUT 126 stored in the memory 88 and/or 116, such as an omega parameter LUT 124 and/or a $NH_3$, $NO_X$, and/or post catalyst emission LUT 126. The omega parameter LUT 124 may provide a deterioration factor 122 (e.g., Omega_Vanadium, Omega_zeolite, etc.) that indicates how much the catalyst has deteriorated (e.g., due to aging) based at least in part on one or more operating parameters, such as the time (e.g., from clock 120) and/or a type of the catalyst (e.g., vanadium, zeolite, etc.), as different catalysts may age at different rates. In other words, the processor 86 and/or 114 may utilize the LUT 124 and/or post catalyst emission LUT 126 to provide omega values based on time and/or a type of catalytic components. For example, the omega values may be associated with active site density of vanadium, zeolites, and/or precious metals. For instance, as vanadium often does not withstand temperatures as high as zeolite, the processor 86 and/or 114 may determine that vanadium omega values increase faster than zeolite omega values at higher temperatures than optimal temperatures for vanadium over a similar duration of time. Further, the processor 86 and/or 114 may adjust the deterioration factor 122 linearly and/or exponentially, as the deterioration of some types of catalysts may vary linearly and/or exponentially based on time. The deterioration factor 122 may also be based on precious metal loading of the catalyst.

A similar process may be performed by the processor 86 and/or 114 based on post catalyst $NH_3$ and/or $NO_X$ emissions. For example, the processor 86 and/or 114 may determine the deterioration factor 122 that indicates how much the catalyst has deteriorated based on $NH_3$, $NO_X$, and/or other post catalyst emissions. The LUT 126 may include different deterioration rates based on quantities of $NH_3$ and/or $NO_X$ detected. Further, the deterioration rates may vary depending on the type of post catalyst emissions, similar to the types of catalysts described above.

The processor 86 may adapt the $NH_3$ storage 140 of the catalyst assembly 80 based on the estimation signal 132 to account for the deterioration of the catalyst. The estimated variables are then utilized to add an adaptation term 142 to modify the reductant injection command 90 (e.g., a urea injection command, NH3 injection command, etc.) of the combustion engine 82 based at least in part on the conversion performance.

As shown in FIG. 5, the clock 120 may be used with pre-SCR $NH_3$ and/or $NO_X$, post-catalyst $NH_3$ and/or $NO_X$, or both. That is, the deterioration factor 122 may be generated from a pre-SCR LUT 124, a post-catalyst LUT 126, or both. In FIG. 5, the estimation signal 132 accounts for the deterioration factor 122 using in both pre-SCR (e.g., reference number 144) and post-catalyst (e.g., reference number 146) values. Further, post catalyst emissions controls 148 may also account for the deterioration factor 122 and the reductant injection command 90 may be based at least in part on the adaptation terms 142 (e.g., a linear or weighted combination of the one or more adaptation terms 142).

Figure 6:
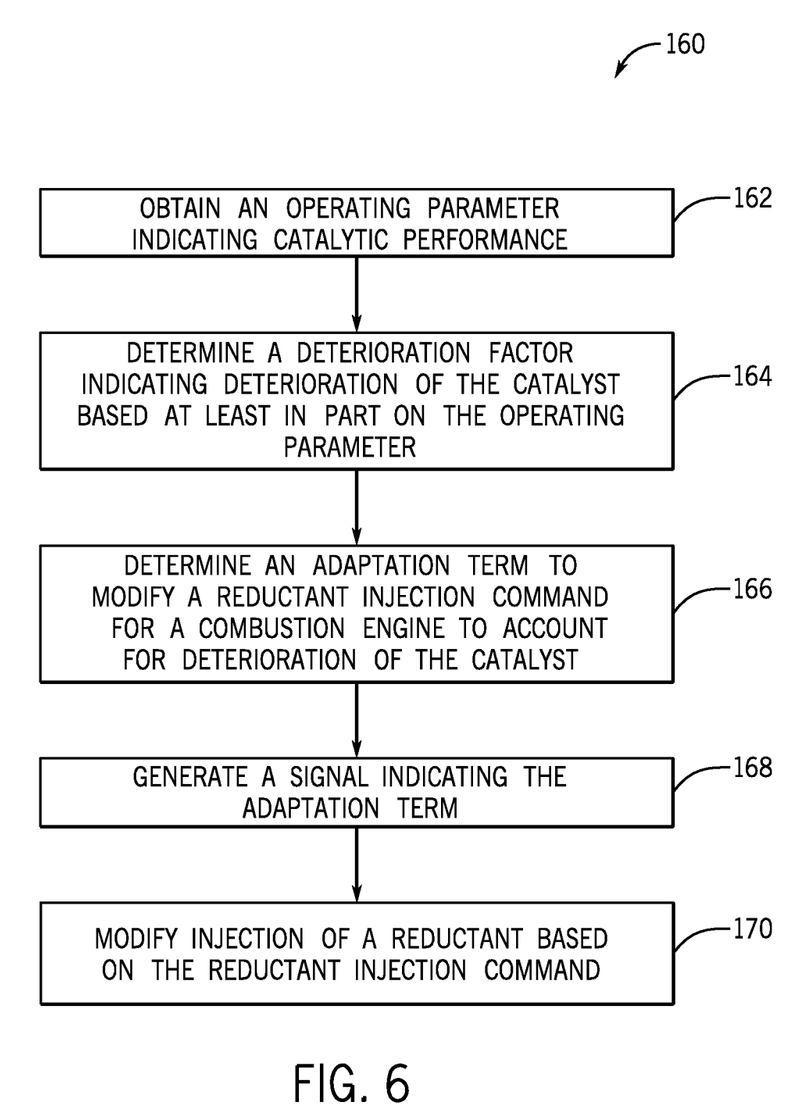
FIG. 6 is a flow diagram of an embodiment of a process performed by a processor of the controllers of FIG. 5.

The processor 86 and/or 114 may execute instructions (e.g., code) stored in the memory 88 and/or 116 to carry out the operation of the exhaust treatment system 78 in accordance with the processes described herein. FIG. 6 is a flow diagram of an embodiment of a process 160 performed by one or more of the processors 86 and/or 114 of the engine controller 84 and/or the reductant injection controller 112. This process 160 may be applied to SCR catalysts for lean burn engines. The process 160 may begin by the processor 86 obtaining signals indicating catalyst performance (block 162). Catalyst performance indications may be obtained via the sensors 96 and/or the clock 120. The process 160 may then continue by determining (block 164) a deterioration factor indicating how much the catalyst has deteriorated based on the catalyst performance. Next, one or more of the processors 86 and/or 114 may determine an adaptation term to modify a reductant injection command for the engine 82 to account for deterioration of the catalyst (block 166). Then, the processor 86 and/or 114 may generate a signal that is based on the adaptation term that modifies the reductant injection command. For example, the processor 86 and/or 114 may generate a signal indicating the reductant injection command (block 166). The processor 86 and/or 114 may then modify injection of a reductant based on the reductant injection command (block 170). By modifying the reductant injection based on an adaptation term that accounts for aging of a catalyst, the controller can enable the combustion engine 82 to remain in emissions compliance for an extended duration of time as the catalyst ages.

Technical effects of the present embodiments relate to controlling an air/fuel ratio or reductant injection of an engine. In certain embodiments, the engine may include one or more operating parameters that are used to indicate catalyst performance. A controller may receive the operating parameters which may be used to determine a deterioration factor of the catalyst. In an embodiment, the deterioration factor indicates aging of the catalyst. The controller may determine an adaptation term to modify an air-fuel ratio or a reductant injection to account for the aging of the catalyst. By changing the air-fuel ratio or the reductant injection, the engine can remain in emissions compliance for an extended duration and the lifetime of the engine can be improved.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an exhaust treatment system configured to treat emissions from a combustion engine via a catalyst; and
a controller configured to:
obtain an amount of time associated with catalyst performance;
determine a first deterioration factor indicating deterioration of the catalyst based at least in part on the amount of time;
determine a second deterioration factor based on post catalyst emissions of the combustion engine;
determine an adaptation term configured to modify a reductant injection command for the combustion engine based on a combination of the first deterioration factor and the second deterioration factor to account for deterioration of the catalyst; and
output a signal to modify reductant injection of the exhaust treatment system based at least in part on the adaptation term.

2. The system of claim 1, wherein the adaptation term comprises a linear or weighted combination of $NH_3$ storage estimates, species concentration estimates, or any combination thereof.

3. The system of claim 2, wherein the controller utilizes a map of deterioration factors to analyze aging of the catalyst based on $NH_3$ storage estimates, species concentration estimates, or any combination thereof.

4. The system of claim 1, wherein controller is configured to modify the reductant injection command to enable the combustion engine to be in emissions compliance for an extended duration of time as the catalyst ages.

5. The system of claim 1, wherein the exhaust treatment system comprises a selective catalytic reduction (SCR) assembly.

6. The system of claim 1, wherein the amount of time corresponds to how long the catalyst has been operating.

7. The system of claim 1, comprising the combustion engine, wherein the combustion engine comprises a lean-burn engine controlled by the controller, and wherein the controller regulates or adjusts injection of a reductant based on the reductant injection command.

8. An electronic control unit, comprising:
a processor operatively coupled to a memory, wherein the processor is programmed to execute instructions on the memory to:
obtain an amount of time associated with how well a catalyst is performing in treating emissions from a combustion engine;
determine a first deterioration factor that indicates how much the catalyst has deteriorated based at least in part on the amount of time;
determine a second deterioration factor based on post catalyst emissions of the combustion engine;
determine an adaptation term configured to modify a reductant injection command for the combustion engine based on a combination of the first deterioration factor and the second deterioration factor to account for deterioration of the catalyst; and
output a signal to modify reductant injection for treating emissions from the combustion engine based at least in the adaptation term.

9. The electronic control unit of claim 8, wherein the processor is configured to utilize a look-up table that provides omega values based on the amount of time and a type of the catalyst, wherein the omega values indicate the deterioration factor of the catalyst.

10. The electronic control unit of claim 9, wherein the omega values are associated with active site density of Vanadia, zeolites, or any combination thereof, in an SCR catalyst.

11. The electronic control unit of claim 8, wherein the deterioration factor of the catalyst is linearly or exponentially adjusted based on the amount of time.

12. The electronic control unit of claim 8, wherein the adaptation term is based at least in part on a model based estimator that utilizes an $NH_3$ measurement.

13. The electronic control unit of claim 8, wherein the adaptation term is based at least in part on flow rate, temperature, species inputs, or a combination thereof.

14. One or more non-transitory computer-readable media encoding one or more processor-executable routines wherein the one or more routines, when executed by a processor of a controller, cause acts to be performed comprising:
obtaining an amount of time associated with a conversion performance of a catalyst utilized to treat emissions from a combustion engine;
determining a first deterioration factor that indicates how much the catalyst has deteriorated based at least in part on the amount of time;
determining a second deterioration factor based on emissions of the combustion engine;
determining an adaptation term configured to modify a reductant injection command for the combustion engine based on a combination of the first deterioration factor and the second deterioration factor to account for deterioration of the catalyst; and
outputting a signal to modify reductant injection for treating emissions from the combustion engine based on the adaptation term.

15. The non-transitory computer readable medium of claim 14, wherein the deterioration factor of the catalyst is linearly or exponentially adjusted based on time.

16. The non-transitory computer readable medium of claim 15, wherein the processor of the controller causes acts to be performed comprising determining the adaptation term based on NH3 estimates, species concentration estimates, or any combination thereof.

17. The non-transitory computer readable medium of claim 14, wherein determining the second deterioration factor comprises utilizing a look-up table having a map of deterioration factors for post-catalyst emissions.

18. The non-transitory computer readable medium of claim 17, wherein the post catalyst emissions comprise $NO_x$, $NH_3$, or any combination thereof.

19. The non-transitory computer readable medium of claim 14, wherein the amount of time is determined based on clock cycles of the controller.

* * * * *